United States Patent [19]

Bourdeau et al.

[11] Patent Number: 5,063,386
[45] Date of Patent: Nov. 5, 1991

[54] DEVICE FOR THE DETECTION OF THE SIGNALS OF TRANSPONDERS INTERROGATED BY A SECONDARY RADAR IN THE PRESENCE OF MULTIPLE-PATH PHENOMENA

[75] Inventors: Alain Bourdeau, Limours; Claude de Volder, Auffargis, both of France

[73] Assignee: Thomson-CSF, Puteaux, France

[21] Appl. No.: 601,351

[22] Filed: Oct. 23, 1990

[30] Foreign Application Priority Data

Nov. 3, 1989 [FR] France .................. 89 14416

[51] Int. Cl.⁵ .................. G01S 13/78; G01S 13/44
[52] U.S. Cl. .................. 342/40; 342/37
[58] Field of Search ............ 342/37, 40, 43; 375/99; 455/65, 303

[56] References Cited

U.S. PATENT DOCUMENTS 4,334,224 6/1982 Gordon .................. 342/39
4,970,518 11/1990 Cole, Jr. .................. 342/37

FOREIGN PATENT DOCUMENTS 55151 6/1982 European Pat. Off. .

OTHER PUBLICATIONS

IEE, International Conference, Radar '87, London, Oct. 19-21, 1987, pp. 237-241; A. J. McDevitt et al.: "Operation of Monopulse SSR at Difficult Sites".
Alta Frequenza, vol. 52, No. 5, 1983, pp. 350-364, Milano, IT; G. Benelli et al.: "Angle Estimation and Discrimination of Monopulse SSR Replies in the Presence of Synchronous Interference".

Primary Examiner—Gilberto Barrón, Jr.
Attorney, Agent, or Firm—Oblon, Spivak, McClelland, Maier & Neustadt

[57] ABSTRACT

The device improves the decoding of the replies in S mode deformed by multiple-path phenomena or by imbrication with replies in standard A or C mode. To do this, the device carries out the following in the reception video signal Log Σ of the secondary radar: determines a pulse level reference value of the data block of the reply by a study of the histogram of the presumed pulse levels of data and compares the level of the reception signal Log Σ taken at the middle of each time interval that may be occupied by a data pulse with the level reference value, a data pulse being detected or not detected according to the result of the comparison. Should there be a negative result in a baud period, it may recommence similar operations on the angle measurement video signal Σ/Δ if the secondary radar is a monopulse radar.

6 Claims, 2 Drawing Sheets

DEVICE FOR THE DETECTION OF THE SIGNALS OF TRANSPONDERS INTERROGATED BY A SECONDARY RADAR IN THE PRESENCE OF MULTIPLE-PATH PHENOMENA

BACKGROUND OF THE INVENTION

1. Field of the Invention

The present invention pertains to air traffic surveillance, notably civilian air traffic surveillance and, more particularly, to air-ground cooperating systems that enable the aircraft present in a certain volume to be located in terms of radial distance and azimuth, and to be interrogated.

2. Description of the Prior Art

These cooperating systems include a surveillance radar, called a secondary surveillance radar, which uses a directional and rotating antenna to transmit amplitude modulated and phase modulated pulses at the 1030 MHZ frequency and transponders on board aircraft which reply by means of pulse trains that are amplitude modulated at the 1090 MHz frequency. For civil aviation, interrogations and replies may be given in different modes: at present in the A and C modes and in future in the S mode which are distinguished notably by the formats of the interrogation and reply pulse trains.

In the S mode, which enables a selective interrogation of the aircraft through the use of an identification number proper to each aircraft, and resolves the problems of traffic congestion encountered with the A and C modes, the response consists of a preamble formed by a sequence of four pulses, the positions of which are invariable, followed by a data block composed of 56 or 112 pulses of 0.5 $\mu$s coded in modulation of position on successive time intervals of 1 $\mu$s. A redundant coding with parity check at the data block enables error-free decoding of a message localized by the detection of the preamble pulses when it has undergone deterioration in a zone of less than 24 $\mu$s.

It turns out to be the case that the deterioration of the message often goes beyond 24 $\mu$s, notably in the case of multiple paths where the deterioration may affect the entire message, and in cases of interlacing of a response in S mode with several responses in standard A or C mode.

Multiple-path phenomena frequently occur in terminal zones when the aircraft is close to the ground and to the secondary interrogation radar. They are due to reflections, of the reply from the transponder, off buildings and off the ground. These reflections arrive with time lags in relation to the direct reply and disturb it.

The present invention is designed to improve the detection of the messages contained in these responses in the presence of radioelectrical disturbances.

SUMMARY OF THE INVENTION

An object of the invention is a device for the detection of signals from transponders interrogated by a secondary radar in the presence of multiple-path phenomena, each of these signals being formed by a pulse train arranged in a determined format with formatting pulses that identify the position of the data pulses, wherein said device includes:

a circuit for identifying the format of a transponder signal provided with means for detecting the formatting pulses contained in the reception signal;

a time base synchronized by the format identification circuit and provided with means to generate timing signals identifying the time intervals, in the reception signal, that may possibly be occupied by data pulses of a transponder signal, their middles as well as zones centered on these middles;

a circuit for determining presumed data pulses in the reception signal, having its timing rate set by the time base and being provided with means to set up a correlation between a first sample of the level of the reception signal, taken at the middle of each time interval that may possibly be occupied by a data pulse of a transponder signal, and a second sample and third sample of the level of the reception signal taken during these same time intervals at instants surrounding the instant when the first sample is taken, and means to generate a weighting coefficient associated with each value taken by the first sample representing a probability of the presence of a data pulse that is all the greater as said correlation is high, a circuit for determining a reference level of the reception signal determining a reference amplitude level of pulses for each of the signals of the transponder, the format of which has been identified in the reception signal by the format identification circuit, having its timing rate set by the time base and being provided with means to select the level taken on a majority basis by the reception signal in the middle of the time intervals that may possibly be occupied by data pulses of a responder signal in weighting the frequency of appearance of the levels considered by the weighting coefficients prepared by the circuit for determining presumed data pulses and, a circuit for detecting data pulses in the reception signal for each of the transponder signals, the format of which has been identified in the reception signal by the format identification circuit, including means for the recognition of pulses whenever the level of the reception signal at the middle of a time interval that might possibly be occupied by a pulse belongs to a certain range of values centered on the reference level delivered by the circuit for determining the reference level of the reception signal for the transponder signal considered.

The circuit for determining the reference level of the reception signal is, moreover, advantageously provided with means determining said reference level on the basis of the mean of the values that are taken, with frequencies weighted by the weighting coefficients prepared by the circuit for determining presumed data pulses, by the levels of the reception signal at the middle of the time intervals that might be occupied by data pulses of a transponder signal and belong to a range of values attained for a number of times, taking account of the weighting coefficients, that is at least equal to half of the number of times at which the value of the majority-based level is attained.

BRIEF DESCRIPTION OF THE DRAWINGS

Other characteristics and advantages of the invention will emerge from the following description of an embodiment given as an example. This description shall be made with reference to the appended drawings, of which.

DESCRIPTION OF A PREFERRED EMBODIMENT

The detection device according to the invention shall be described in the context of the processing of reception video signals coming from the sum and difference channels of a monopulse secondary radar that interrogates transponders in S mode.

Figure 1:
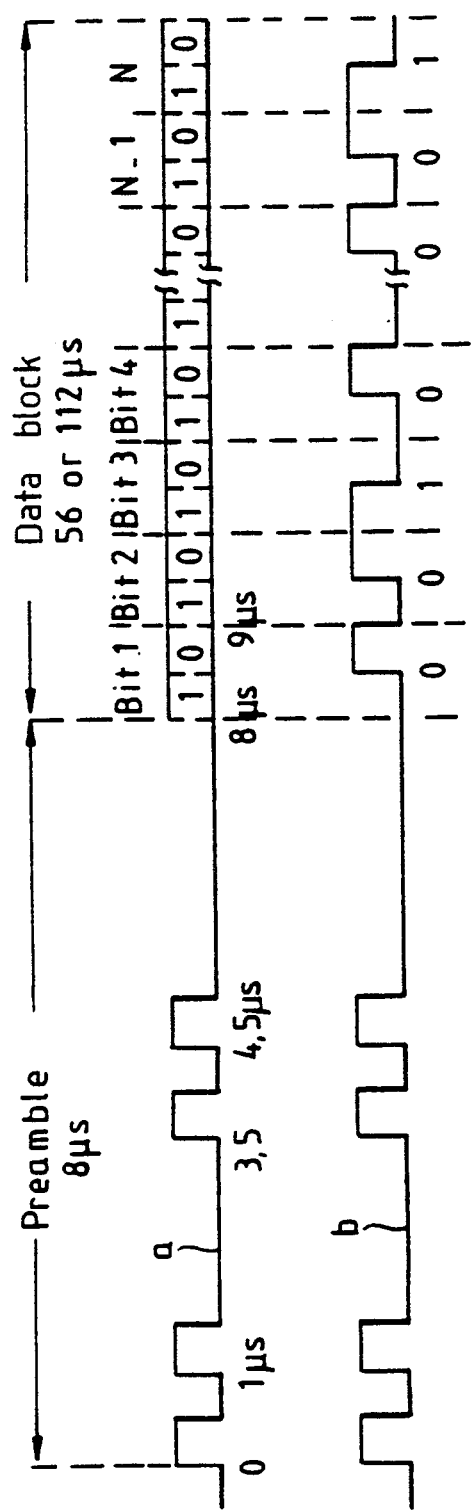
FIG. 1 is a timing diagram illustrating the form of a transponder reply in S mode and, FIG. 2 is a block diagram of a detection device according to the invention associated with a shaping device.

The curve a of FIG. 1 represents the format of a transponder signal in S mode and the curve b gives a particular example of it. This signal is formed by a pulse train that performs an amplitude modulation of a 1090 MHz carrier frequency and is formed by an 8 $\mu$s preamble followed by a 56 $\mu$s or 112 $\mu$s data block. Each pulse has a duration of 0.5 $\mu$s and takes up a period of 1 $\mu$s. The preamble contains two pairs of successive pulses with fixed positions that enable the format of a response in S mode to be identified. The data block contains a sequence of 56 or 112 pulses that are coded in position modulation. Each of these pulses, depending on the binary value 1 or 0 represented, occupies either of two successive 0.5 $\mu$s time intervals constituting a baud period of 1 $\mu$s.

Figure 2:
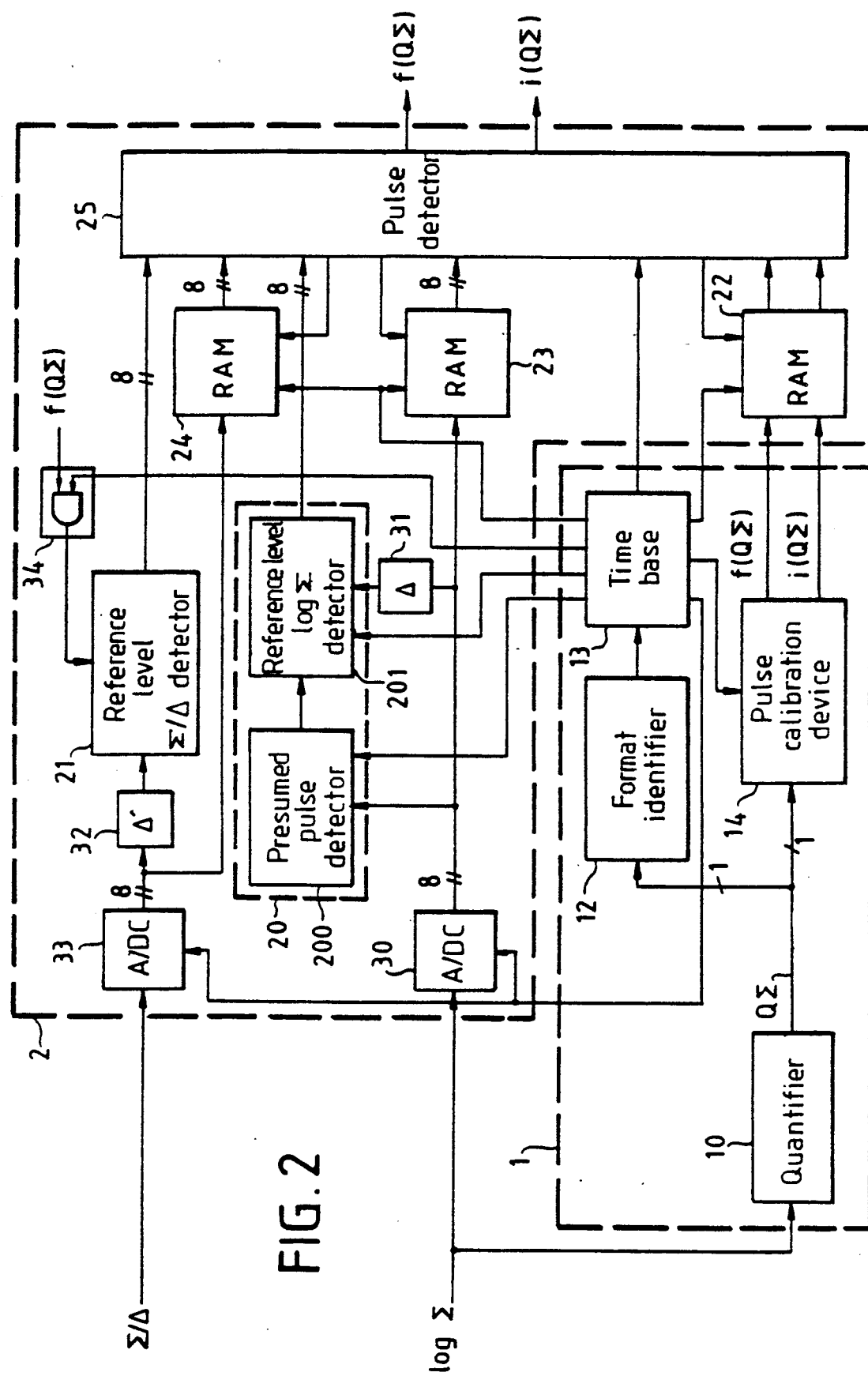

FIG. 2 is a block diagram of a detection device according to the invention, that is associated with a shaping device and processes the following at the same time: the reception video signal of the sum channel of a monopulse secondary radar demodulated and put into logarithmic form (hereinafter called the reception signal Log$\Sigma$) and the quotient of the demodulated reception video signals of the sum channel $\Sigma$ and difference channel $\Delta$ of the same monopulse secondary radar (hereinafter called the angle measurement signal $\Sigma/\Delta$ because it makes it possible to specify the direction of the transponder which is the source of the reply within the major illumination lobe of the antenna of the monopulse secondary radar).

The shaping device 1 works by means of the reception signal Log$\Sigma$ alone. This device 1 can be split up into a quantifier circuit 10, followed by a format-identifying circuit 12, a time base 13 and a pulse calibration circuit 14.

The quantifier circuit 10 puts the reception signal Log$\Sigma$ into binary form Q$\Sigma$ by separating the overlapping pulses that it contains because of the overlapping of replies due to multiple-path phenomena and to interlacing with replies in standard A or C mode. It proceeds by comparison of the reception signal Log$\Sigma$ with a −6dB self-adaptive threshold. Its structure is known and described, for example, in the U.S. Pat. No. 4,529,984.

The format identification circuit 12 detects the preamble of a reply in S mode by checking for the presence of the two pairs of preamble pulses in the digitized and quantified signal Q$\Sigma$. It performs this check, for example by testing for the presence of an edge at the start of each pair of pulses, four high states at the four pulses and a gap between the pulses of each pair.

The time base 13 is synchronized by the format identification circuit 12 and delivers various timing signals. The 16 MHz frequency of these timing signals sets the rate of the sampling. The time base 13 further gives a signal at the frequency 2 MHz appearing in a window that delimits the duration of a data block following a detected preamble of a reply in S mode, and identifies the baud periods in a data block and, within these baud periods, identifies the two successive time intervals in which a data pulse should be located.

The pulse calibration circuit 14 is synchronized by the time base 13. This circuit 14 works on the quantified and digitized signal Q$\Sigma$ and gives calibrated data block pulses f(Q$\Sigma$) as well as a piece of information i(Q$\Sigma$) on the quality of the calibration done. To calibrate the pulses of a data block, in each baud period the circuit 14 carries out a first summing of the eight digital samples of the quantified reception signal Q$\Sigma$ occupying the first 0.5 $\mu$s time interval, then a second summing of the following eight digital samples of the quantified reception signal occupying the second 0.5 $\mu$s time interval. It then compares the two sums and generates a calibrated pulse in the time interval corresponding to the highest sum if the difference between the two sums is greater than a certain threshold representing a permissible noise level. Should the difference between the two sums be greater than the threshold, it generates, in addition to the calibrated pulse, a piece of information i(Q$\Sigma$) indicating that the quality is right. If the opposite is the case, it routinely generates a pulse calibrated in one of the time intervals, for example the first one, and gives out a piece of information i(Q$\Sigma$) indicating that the quality is wrong. The calibrated pulses f(Q$\Sigma$) of the data block are transmitted with the pieces of information on quality i(Q$\Sigma$) to a computer that decodes the data in not taking account of the calibrated pulses corresponding to information indicating wrong quality.

The detection device 2 enables the correction of the position of a number of calibrated pulses of data given by the shaping device 1 with information indicating wrong quality. It works by means of the reception signal Log$\Sigma$ and the angle measurement signal $\Sigma/\Delta$. It includes mainly the following:

a device 20 determining a reference amplitude level of pulses, for the duration of a reply, in the reception signal Log$\Sigma$, a circuit 21 determining a reference amplitude level of pulses, for the duration of a reply, in the angle measurement signal $\Sigma/\Delta$, a battery of memories 22, 23, 24 storing, in the duration of a reply, the data block calibrated pulses f(Q$\Sigma$) and the information on quality i(Q$\Sigma$) delivered by the shaping device 1, and also storing the reception signal Log$\Sigma$ and the angle measurement signal $\Sigma/\Delta$, and a pulse detection circuit 25 working on the basis of the reception signal Log$\Sigma$ and its pulse reference amplitude level and, possibly, on the basis of the angle measurement signal $\Sigma/\Delta$ and its pulse reference level whenever the shaping device 1 sends a piece of information i(Q$\Sigma$) indicating that the quality is wrong.

The device 20 determining a reference amplitude level of pulses in the reception signal Log $\Sigma$ consists essentially of a circuit 200 for determining presumed pulses and a circuit 201 for determining a reference level.

The device 200 for determining presumed pulses has its timing rate set by the time base 13 and it is connected behind an analog/digital converter 30 which samples the reception signal Log $\Sigma$ in digital form at a rate of 16 MHz delivered by the time base 13. It makes a search, in the reception signal Log $\Sigma$, in the middle of each 0.5 $\mu$s time interval of a data block, for zones with constant or almost constant level corresponding to pulse peaks which, owing to the existence of the carrier at these instants, make a contrast with the noise-ridden zones with fluctuating level of the inter-pulse intervals where the carrier is eliminated and where pulse trains are found. To do this, it has means to select three successive samples of the level of the reception signal Log$\Sigma$ in the vicinity of the middle of each 0.5 $\mu$s time interval of the data block, correlate them and deliver a weighting coefficient that is equal to 3 if the values of the level samples correspond to each other to within $\pm 1$, or is equal to 2 if only the values of two level samples correspond to each other to within $\pm 1$, and is equal to 1 in the other cases.

The circuit 201 for determining a reference level of the reception signal Log$\Sigma$ is connected at input to the output of the circuit 200 for determining presumed pulses and, by means of a delay circuit 31, to the output of the analog/digital converter 30. It also has its timing rate set by the time base 13 which takes account of the delay of the delay circuit 31 designed to compensate for the time taken to compute a weighting coefficient. It determines the level, taken on a majority basis by the reception signal Log $\Sigma$, at the middle of each 0.5 $\mu$s time interval of a data block in weighting the frequency of appearance of these levels by the weighting coefficients prepared by the circuit 200 for determining presumed pulses. It then adopts, as a reference level, the mean of the level values belonging to a range of values achieved by the levels at a number of times which, taking account of the weighting coefficients, is at least equal to half the number of times at which the value of the majority-based level is attained. To do this, it has:

a set of counters, equal in number to the different possible level values, which are addressed by the value of the signal level sampled in the middle of each 0.5 $\mu$s time interval of a data block and incremented by a value 1, 2 or 3 of the associated weighting coefficient delivered by the circuit 200 for determining presumed pulses, and a logic circuit for the analysis of the histogram of the level samples recorded in the set of counters, this logic circuit delimiting, at the end of each data block, a range of counters located on either side of the counter containing the maximum value and having contents greater than or equal to half of this maximum value in order to reject and remove false level values that manifestly do not correspond to data pulses from the histogram, and determining the mean of the level values addressing counters in said range, in taking account of the number of times when each of these counters has been addressed.

The circuit 21 determining a reference amplitude level of pulses in the angle measurement signal $\Sigma/\Delta$ is connected at input, by means of a delay circuit 32, to the output of an analog/digital converter 33 which samples the angle measurement signal $\Sigma/\Delta$ at a rate of 16 MHZ delivered by the time base 13. It also has its timing rate set by the time base 13 by means of a logic circuit 34 placed under the control of the pulse calibration circuit 14, the time base 13 taking account of the delay of the delay circuit 32 designed to compensate for the computation time of the pulse calibration circuit 14 in a baud period. It determines the level taken on a majority basis by the angle measurement signal $\Sigma/\Delta$ in the middle of the 0.5 $\mu$s time intervals of a data block of a reply where the pulse calibration circuit 14 has recognized data pulses and it then adopts, as a reference level, the mean of the level values belonging to a range of values attained by the levels at a number of times which is at least equal to half the number of times at which the value of the majority-based level is attained. To do this, it has:

a set of counters, equal in number to the different possible level values, which are addressed by the value of the signal level sampled in the middle of each 0.5 time interval of a data block where the pulse calibration circuit 14 has recognized data pulses, and incremented each time by one unit, and a logic circuit for the analysis of the histogram of the level samples recorded in the set of counters, this logic circuit delimiting, at the end of each data block, a range of counters located on either side of the counter containing the maximum value and having contents greater than or equal to half of this maximum value in order to reject and remove false level values that manifestly do not correspond to data pulses from the histogram, and determining the mean of the level values addressing counters in said range.

Throughout the duration of a reply in S mode, namely a duration of 56 $\mu$s for a short reply or 112 $\mu$s for a long reply, the memory 22, placed as a buffer at the output of the calibration circuit 14 stores the 112 or 224 samples, taken at all the 0.5 $\mu$s time intervals of a data block, of each of the data block calibrated pulse signals f(Q$\Sigma$) and quality indicating information signals i(Q$\Sigma$) delivered by the calibration circuit 14. To do this, it receives write commands from the time base 13. These write commands are generated regularly at all the 0.5 $\mu$s time intervals of a data block of a response in S mode during reception, with a delay period taking account of the processing time of the calibration circuit 14.

Throughout the duration of a reply in S mode the memory 23, placed as a buffer at the output of the digital/analog converter 30, stores the 112 or 224 samples of the reception signal Log $\Sigma$, taken at the middle of each 0.5 $\mu$s time interval of a data block during reception. To do this, it receives write commands from the time base 13. These write commands are generated regularly at the middle of all the 0.5 $\mu$s time intervals of a data block of a response in S mode during reception.

Throughout the duration of a reply in S mode the memory 24, placed as a buffer at the output of the digital/analog converter 33, stores the 112 or 224 samples of the angle measurement signal $\Sigma/\Delta$ taken at the middle of each 0.5 $\mu$s time interval of a data block during reception. To do this, it receives the same write commands as the memory 23 from the time base 13.

The detection circuit 25 is connected behind the battery of memories 22, 23, 24, the pulse calibration circuit 14, the circuit 201 for determining a reference level of the reception signal Log $\Sigma$ and the circuit 21 for determining a reference level of the angle measurement signal. It has a logic sequencer triggered by the time base 13 at the end of reception of a data block of a reply in S mode. This logic sequencer reads, one by one, the values of the samples of the reception signal Log $\Sigma$ and the angle measurement signal $\Sigma/\Delta$ stored in the memories 23, 24 as well as the data block calibrated pulse signals j (Q$\Sigma$) and the quality indicating information signal i(Q$\Sigma$) which are stored in the memory 22 and correspond to each sample. This logic sequencer also makes an analysis, at each baud period of the data block (two successive 0.5 $\mu$s time intervals), of the signals delivered by the calibration circuit 14.

Whenever there is a piece of information, in a baud period, indicating that the quality is right the, detection circuit 25 transmits the data block 1 calibrated pulse signal f(Q$\Sigma$) and the information on quality i(Q$\Sigma$), without modifying them, to a computer which decodes the data block.

Whenever there is a piece of information, in a baud period, indicating that the quality is wrong, the detection circuit 25 tries to correct the data block calibrated pulse signal f(QΣ) and the information on quality i(QΣ) before transmitting them to a computer which decodes the data block. To do this, it makes a comparison of the two stored samples of the reception signal Log Σ, which correspond to the baud period considered, with the reference value of the reception signal LogΣ. If the difference is below a certain threshold for one of the stored samples of the reception signal Log Σ, the calibrated pulse is placed on the 1 μs time interval corresponding to this sample and the information on quality is changed into a piece of information indicating right quality. If this is not so, with the two memorized samples of the reception signal Log Σ not replying to the test or replying to it simultaneously, the detection circuit 25 makes a comparison of the two stored samples of the angle measurement signal Σ/Δ that correspond to the baud period considered with the reference value of the angle measurement signal. If the difference is below a certain threshold for one of the stored samples of the angle measurement signal, the calibrated pulse is placed on the 1 μs time interval corresponding to this sample, and the information on quality is changed into a piece of information indicating that the quality is right. If this is not so, with the two memorized samples of the angle measurement signal Σ/Δ not replying to the test or replying to it simultaneously, the detection circuit 25 transmits the data block calibrated pulse signal f(QΣ) and the piece of information i(QΣ) indicating that the quality is wrong, without modifying them, in leaving it to the computer, which decodes the data block, to correct the false information by means of the redundancy of the code.

It is possible, without going beyond the scope of the invention, to modify certain provisions thereof or to replace certain means by equivalent means. It is possible, notably, to eliminate the shaping device 1, and the detection device then has its own format identification circuit and its own time base, and a pulse detection circuit 25 working on each baud period of a S mode reply data block, as would be the case if it constantly received a piece of information i(QΣ) indicating that the quality is wrong, and then generating the data block calibrated pulses f(QΣ) and a piece of information on quality i(QΣ). The detection device 2 may be simplified and may be one that does not include the processing chain relating to the angle measurement signal Σ/Δ. In the same way, again with a view to simplification, the circuits for determining the reference levels (201, 21) may adopt a reference level which is the level taken on a majority basis by the signal considered on the 0.5 μs time intervals of the data block occupied by presumed pulses, and it is possible for them not to make a search for mean values. Furthermore, the thresholds adopted for the different comparisons may be not fixed but automatically linked to the power of the response received to take account of the variable amplitude of the noise.

What is claimed is:

1. A device for detecting transponder signals generated by transponders interrogated by a secondary radar in the presence of multiple-path phenomena, wherein each of said transponder signals is formed by a pulse train arranged in a determined format with formatting pulses that identify the position of data pulses, wherein said device comprises:

a format identification circuit for identifying the format of a transponder signal including means for detecting said formatting pulses contained in a reception signal;

a time base synchronized by said format identification circuit and including means to generate timing signals for identifying time intervals in said reception signal that may possibly be occupied by data pulses of a transponder signal, and for identifying a middle of said time intervals and zones centered on said middles of said time intervals;

a presumed pulse determining circuit for determining presumed data pulses in said reception signal, said presumed pulse determining circuit having its timing rate set by said time base and including means to set up a correlation between a first, a second and a third sample of respective levels of said reception signal, wherein said first sample is taken at said middle of each said time interval that may possibly be occupied by a data pulse of a transponder signal, and said second sample and said third sample are taken during each said time interval at instants surrounding an instant when said first sample is taken, said presumed pulse determining circuit further including means to generate a weighting coefficient which is associated with each level determined by said first sample, and represents a probability of the presence of a data pulse in said time interval that may possibly be occupied by a data pulse of a transponder signal, wherein a value of said weighting coefficient corresponds to a level of correlation of said first sample, said second sample and said third sample;

a circuit for determining a reference level of said reception signal, thereby determining a reference amplitude level of pulses for each of the signals of said transponder whose format has been identified in said reception signal by said format identification circuit, said circuit for determining a reference level having its timing rate set by said time base and including means to select said reference level of said reception signal based on a maximum value of a frequency of occurrence of a level of said reception signal taken in the middle of each said time interval that may possibly be occupied by data pulses of a transponder signal wherein each said level considered is weighted by the weighting coefficients prepared by said circuit for determining presumed data pulses; and, a circuit for detecting data pulses in said reception signal for each transponder signal whose format has been identified in the reception signal by said format identification circuit, said circuit for detecting data pulses including means for the recognition of a data pulse whenever a level of said reception signal at the middle of a time interval that might possibly be occupied by a data pulse belongs to a range of values centered on said reference level determined by said circuit for determining the reference level of the reception signal.

2. A device according to claim 1, wherein said circuit for determining the reference level of the reception signal includes means for determining said reference level on the basis of a mean of values of said weighted levels of said reception signal taken at the middle of said time intervals that might possibly be occupied by data pulses of a transponder signal, wherein said means is determined from values which belong to a range whose lower limit is at least equal to half of the number of times which the level with the maximum weighted frequency of occurrence is attained.

3. A device according to claim 1, wherein said transponders produce a response signal including position modulated data pulses, each occupying either of two successive time intervals forming a baud period, and said device further includes a data pulse shaping circuit including means for the calibration of said position modulated data pulses whenever a mean level of said reception signal in one of the two successive time intervals of a baud period is greater, by a threshold value, than a mean level of the reception signal in the other of the two successive time intervals of the baud period, and wherein the data pulse detection circuit in the reception circuit is triggered only at the baud periods where the shaping circuit has not detected a single pulse.

4. A device according to claim 3, utilized with a monopulse secondary radar delivering, in addition to the reception signal, an angle measurement signal in which the signals of the transponders appear, wherein said device further comprises:

a circuit for determining a reference level of the angle measurement signal thereby determining a pulse reference level for each of the signals of the transponder that appear in the angle measurement signal, the format of which has been identified in the reception signal by the format identification circuit, said circuit for determining a reference level for each of the signals of the transponder that appear in the angle measurement signal having its timing rate set by a pacing signal which identifies the middle of the time intervals where a pulse has been detected by the shaping circuit and is delivered under the control of the shaping circuit, and being provided with means to select a reference level of the angle measurement signal based on the maximum frequency of occurrence of respective levels of said signals of the transponder that appear in the angle measurement signal and taken in the middle of the time intervals occupied by pulses detected by the shaping circuit, and wherein the data pulse signal detection circuit further includes means for the recognition of pulses in the angle measurement signal whenever the level of the angle measurement signal in the middle of a time interval that might possibly be occupied by a pulse belongs to a range of values centered on the reference level of the angle measurement signal.

5. A device according to claim 4, wherein the pulse recognition means in the angle measurement signal work only on the baud periods in which the shaping circuit and the pulse recognition means in the reception signal have not detected any single pulse.

6. A device according to claim 4, wherein the circuit for determining the reference level of the angle measurement signal further includes means for determining said reference level on the basis of a mean of the values of the respective levels of the angle measurement signal taken at the middle of the time intervals occupied by data pulses detected by the shaping circuit, wherein said means is determined from level values which belong to a range whose lower limit is equal to half of the number of times which the level with the maximum frequency of occurrence if attained.

* * * * *